UNITED STATES PATENT OFFICE.

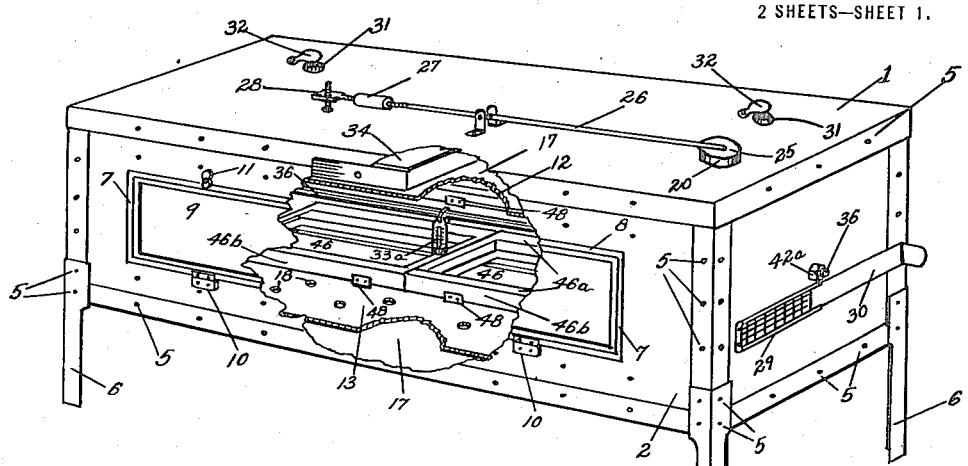
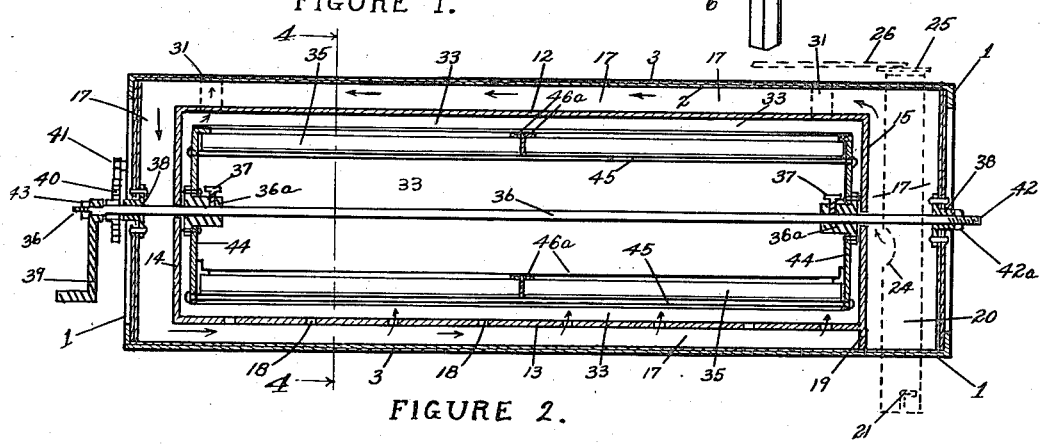
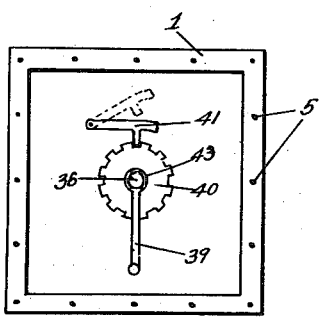
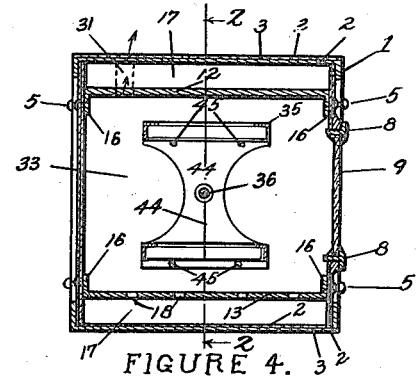

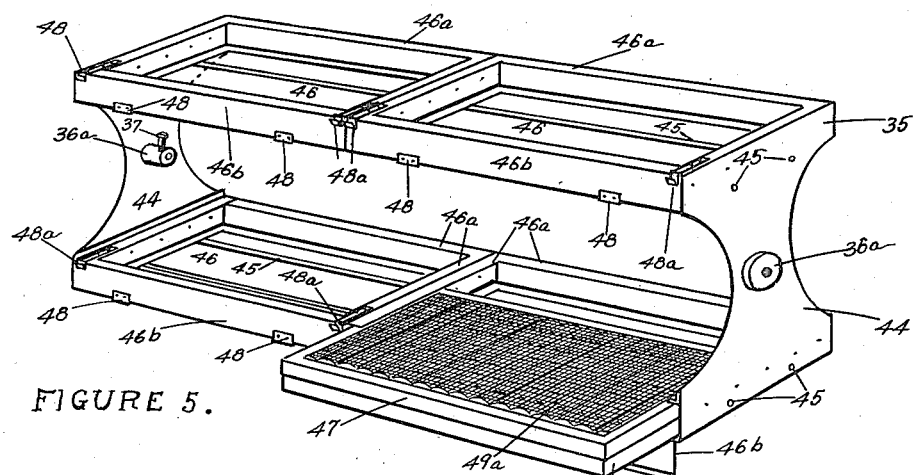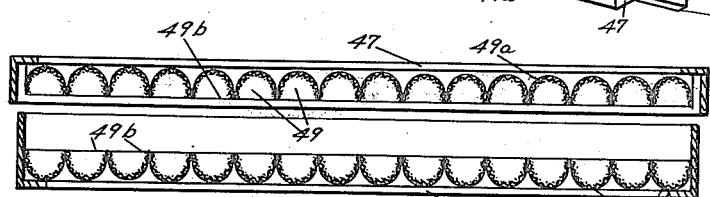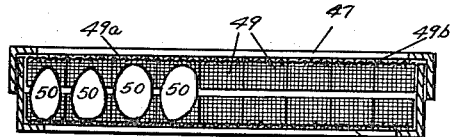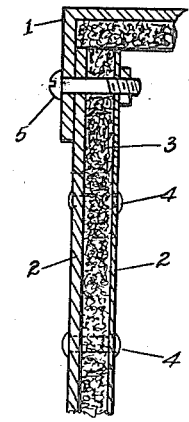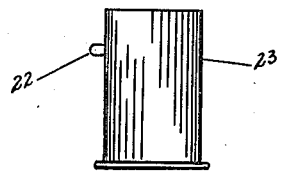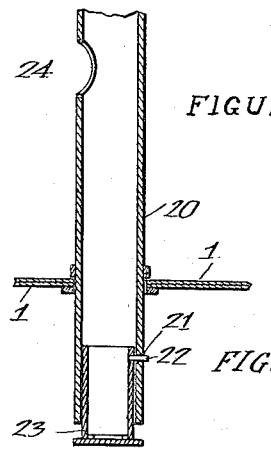

ANNA E. BARBA, OF SAN JOSE, CALIFORNIA.

EGG-TURNING DEVICE FOR INCUBATORS.

1,277,530.  Specification of Letters Patent.  Patented Sept. 3, 1918.

Application filed March 4, 1918. Serial No. 220,256.

*To all whom it may concern:*

Be it known that I, ANNA E. BARBA, a citizen of the United States, residing at San Jose, in the county of Santa Clara and State of California, have invented a new and useful Improvement in Egg-Turning Devices for Incubators, of which the following is a specification.

This invention relates to improvements in an egg turning device for incubators and its objects are:

First—to so prepare and construct an egg turning device for incubators that can not burn, and an egg turning device for incubators that will be constructed entirely of metal.

Second—to so construct an egg turning device for incubators that it may be operated from the outside of the incubator.

Third—to so construct an egg turning device for incubators that the eggs may be turned over without handling the eggs, or the eggs may be turned on either side, as the operator may require.

A still further object of my invention is generally, to improve this class of incubators so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings in which:—

Figure 1 is a perspective view of an improved egg incubator, parts broken away, showing revolving egg tray frame, thermometer, air compartments and moisture receptacle.

Fig. 2 is a longitudinal sectional view of Fig. 1 as shown on line 2—2 of Fig. 4, showing the revolving egg tray frame in position, hot air circulation and heating tube.

Fig. 3 is an end view of Fig. 1, showing the crank, toothed wheel and catch in position.

Fig. 4 is a transverse sectional view of Fig. 1 as shown on line 4—4 of Fig. 2, showing the revolving egg-tray frame in place.

Fig. 5 is an enlarged perspective view of the revolving egg tray frame showing means of holding egg trays in place.

Fig. 6 is a longitudinal section of one of the telescoping egg trays, showing the egg receptacles, top and bottom parts separated.

Fig. 7 is a transverse section of an egg tray assembled showing eggs therein.

Fig. 8 is a detail sectional view of the outer walls of my incubator showing asbestos packing between the sheet metal and bolts for fastening the parts together.

Fig. 9 is a detail view of the casing to which the heating device is attached, showing means of attaching the casing to the hot air tube. Fig. 10 is a detail sectional view of the heating tube and heater casing, parts assembled.

Corresponding and like parts are referred to in the following description and indicated in all the views of the drawings by the same reference numbers.

My improved incubator, forming the subject matter of the present invention comprises a body portion 1 made of a plurality of galvanized sheet metal plates 2 of the required thickness, asbestos packing is shown at 3 positioned between the plates, 2, said plates being fastened together by a plurality of rivets 4, as shown in Fig. 8, the several parts of the body portion 1 are fastened together by a plurality of bolts 5, said body portion 1 being supported on angle iron supports 6, said supports are bolted to body portion 1 at each corner thereof by bolts 5.

The front of body portion 1 has an opening therein as at 7, fitted with a metal frame or sash 8, said frame or sash 8 being fitted with a glass 9; frame 8 is hinged to body portion 1 by hinges 10 and is held shut by turn buttons 11.

Inside of body portion 1 are the horizontal partitions 12 and 13 and vertical partitions 14 and 15 made of galvanized sheet iron of the required thickness having flanges bent thereon as at 16 in Fig. 4, and are bolted to the body portion 1 by bolts 5.

These horizontal and vertical partitions are arranged to form air passages 17 for the circulation of the heated air as shown by the arrows.

The lower horizontal partition 13 has a plurality of perforations 18 through which the heated air passes. The vertical partition 15 is extended downward to the bottom of body portion 1 as at 19, closing the hot air passage 17.

At one end of the air passage 17 is heating tube 20 removably fastened to the top and bottom of body portion 1 and extending a distance through the top and bottom thereof; the lower end of the tube 20 has a bayonet slot 21 adapted to engage an offset projection 22 on the metal heater casing 23, as shown in Fig. 9, which may contain any means of heating desired.

The tube 20 has an openig 24 for the delivery of heat to the hot air passage 17; at the upper end of the heating tube 20 is fitted a damper 25 adapted to control the amount of heat forced through the opening 24 into hot air passage 17; the control being obtained by means of the adjustable counter-balanced rocker arm 26 and counter balance 27; said rocker arm 26 is connected to a thermostat by means of threaded rod 28, thermostat not shown. A further regulation of the heat is obtained by means of the screened opening 29 and closing slide 30, also by ventilating tubes 31 and closure caps 32, said tubes 31 pass through body portion 1, air passage 17 and connect with the egg chamber 33; in egg chamber 33 is placed an incubator thermometer 33$^a$ to ascertain the temperature therein.

In the front of body portion 1 is the removable moisture receptacle 34 connecting with hot air passage 17 adapted to furnish the required amount of moisture to the heated air passing therethrough.

In egg chamber 33 is the revolving egg tray frame 35 and shaft 36, said shaft is fastened to the egg tray frame by means of hubs 36$^a$ and set screws 37 and is rotatively mounted in bearings 38. The shaft is manually operated by crank 39, and is held in any desired position by means of toothed wheel 40 and catch 41.

Shaft 36 is held in position longitudinally by means of threaded portion 42 and nut 42$^a$ and by toothed wheel 40 and crank fastening 43.

The revolving egg tray frame 35 consists of end portions 44 made of galvanized sheet iron of the required thickness and fitted with hubs 36$^a$ with set screws 37 adapted to hold the egg tray frame rigid on shaft 36.

Riveted to end portion 44 are the rods 45 which are for the purpose of holding the end portions rigid in place.

The egg tray receptacles are shown at 46 and are made of sheet iron pressed in shape and riveted together and to the end portions, the flanges 46$^a$ on said receptacles are for the purpose of holding the telescoping egg trays 47 in place. The side 46$^b$ of each egg tray receptacle opens and closes by means of hinges 48, and is fastened shut by spring catches 48$^a$, this arrangement permits the insertion and removing of the egg trays 47 when desired, spring catches 48$^a$ holding the trays in said receptacles 46.

The telescoping egg trays 47 are made of sheet iron frames, one telescoping the other, a plurality of egg receptacles are shown at 49 formed of galvanized wire netting 49$^a$ of the required size and weight soldered to the frames, partitions forming the egg receptacles are shown at 49$^b$ and are made of wire netting and may be fastened in place by soldering or other suitable means. Eggs are shown in place in the receptacles at 50 and the telescoping egg tray closed.

The operation of my improved egg incubator is as follows:—

The body portion 1 being assembled and the egg tray frame in position therein, an incubator thermometer 33$^a$ is placed in the egg chamber 33, the desired heating means is inserted in heating tube 20 and the temperature is brought to the desired degree and maintained at that point by means of thermostatic control, adjustable damper 25 and threaded rod 28. Water is placed in moisture receptacle 34 to furnish moisture to the heated air. Eggs are placed in the receptacles 49 in the telescoping egg trays 47 as shown at 50 in Fig. 7; the trays are put together and inserted through opening 7 of body portion 1 and into the receptacles 46 in the revolving egg tray frame 35 and fastened therein by means of hinged sides 46$^b$ and spring catches 48$^a$. The sash 8 is closed and fastened shut by means of turn buttons 11.

When the eggs require turning the catch 41 is lifted out of engagement with toothed wheel 40 and the crank is turned as required, when the catch 41 is dropped back in engagement with toothed wheel 40 and the position of the egg tray frame is thereby held in place as desired.

When the time arrives for the hatching of the eggs the tops of the egg trays are removed and, as the chickens hatch, they find their way to the glass front and drop down to the bottom of egg chamber 33 where they remain until the proper time to be removed therefrom.

When it is desired to take the body portion 1 apart for shipping, the bolts 5 are removed and the body portion may be nested into a very compact package.

Having thus fully described my invention, what I claim as new, and desire to secure by Letters Patent, is:—

1. In an egg turning device for incubators of the class described, a revolving metal egg tray frame; a shaft; hubs, fastened to the egg tray frame, adapted to engage the shaft passing longitudinally through the egg tray frame; means for fastening the hubs to the shaft; bearings positioned in the ends of the body portion in which the shaft rotates; means by which the shaft and egg tray frame are rotated; means by which the egg tray frame is held in rotated position; metal egg tray receptacles, positioned in the egg tray frame; telescoping metal egg trays; flanges on the egg tray receptacles, adapted to hold the telescoping egg trays in place in the egg tray receptacles; substantially as and for the purpose specified.

2. In an egg turning device for incubators of the class described; a revolving egg tray frame; a shaft centrally positioned longitudinally in the egg compartment; hubs fastened to the egg tray frame; means for fastening the hubs against rotative movement on the shaft; bearings positioned in the body portion, into which said shaft is journaled; means for manually operating said shaft, means for holding said shaft in rotated position; means for holding the shaft in position longitudinally; a plurality of egg tray receptacles in said egg tray frame; means for opening and closing the side of each receptacle; means for fastening the sides shut; telescoping egg trays, adapted to slide into the tray receptacles; egg receptacles, formed of wire netting and fastened to the egg trays, said egg receptacles being adapted to hold and protect each egg against rolling or breaking when the egg tray frame is revolved; substantially as and for the purpose specified.

In testimony whereof I hereby affix my signature in the presence of two subscribing witnesses.

ANNA E. BARBA.

Witnesses:
O. M. VROOMAN,
J. G. McMILLAN.